United States Patent [19]
Noma et al.

[11] Patent Number: 5,605,368
[45] Date of Patent: Feb. 25, 1997

[54] SEAT SLIDING DEVICE FOR VEHICLE

[75] Inventors: Kohji Noma; Osamu Kishi; Minoru Toyota, all of Hiroshima, Japan

[73] Assignee: Mazda Motor Corporation, Hiroshima-ken, Japan

[21] Appl. No.: 656,488

[22] Filed: May 31, 1996

Related U.S. Application Data

[63] Continuation of Ser. No. 218,941, Mar. 28, 1994, abandoned.

[30] Foreign Application Priority Data

Mar. 30, 1993 [JP] Japan .................................. 5-072397
Mar. 16, 1994 [JP] Japan .................................. 6-045333

[51] Int. Cl.$^6$ .................................................. B60N 2/00
[52] U.S. Cl. .......................... 296/64; 296/65.1; 296/69; 297/243; 297/257; 384/47; 248/430
[58] Field of Search .......................... 296/63, 64, 65.1, 296/68.1, 69; 297/243, 257; 312/334.44, 334.46; 384/21, 34, 47; 248/429, 430

[56] References Cited

U.S. PATENT DOCUMENTS 5,222,814   6/1993   Boelryk .................................. 248/430

FOREIGN PATENT DOCUMENTS 63-173736   7/1988   Japan .
63-179247   11/1988  Japan .
2-81738     3/1990   Japan .

Primary Examiner—Dennis H. Pedder
Attorney, Agent, or Firm—Keck, Mahin & Cate

[57] ABSTRACT

A vehicle having a plurality of seats is generally provided with a plurality of seatbelt units and a seat sliding device for adjusting the positions of a first seat and a second seat located rearward of the first seat. The sliding device of the present invention comprises a pair of continuous rail members for guiding the first and second seats in a lengthwise direction of the vehicle. Each of the rails extends across the first and second seats. First and second sliders on the rails carry the first and second seats, respectively, so that both the first and second seats are movable substantially throughout the lengths of the rail members in the lengthwise direction. A first and second latch mechanisms are provided for positioning the first and second seats in place on the rail members, respectively. The first and second latch mechanisms are provided on the first and second sliders so as to be moved together with the corresponding sliders, respectively.

21 Claims, 9 Drawing Sheets

SEAT SLIDING DEVICE FOR VEHICLE

This is a continuation of Ser. No. 8/218,941, filed on Mar. 28, 1994, abandoned.

TECHNICAL FIELD

The present invention relates generally to a seat sliding device for a vehicle, and more particularly, to a seat sliding device, on which a plurality of seats spaced in a lengthwise direction of a vehicle, are movably mounted.

BACKGROUND OF THE INVENTION

A so-called one-box or mono-box car of cab-over type is known in which first and second rear seats defining two rows of rear seats are installed. This type of car is disclosed in, e.g., Japanese Patent Laid-Open Publication No. Sho 63-173736, Japanese Utility-Model Laid-Open Publication No. Sho 63-179247 or Japanese Patent Laid-Open Publication No. Hei 2-81738.

The seat mounting structure in this kind of vehicle typically comprises a first rear seat located behind a driver's seat and an assistant driver's seat, and a second seat located behind the first rear seat, wherein the first and rear seats are carried on the vehicle body by means of respective guide means for permitting the first and second rear seats to move in the lengthwise direction. Thus, the first and second rear seats are adjustable in the space or distance between the driver's seat and the first rear seat or that between the first and second seats.

When a relatively large loading space is needed in a rear zone of the vehicle in order to increase the loading capacity thereof, the seat back or backrest of the second rear seat is backwardly inclined to form a substantially flat loading plane; otherwise, the backrest of the second rear seat is forwardly inclined to enlarge the available loading space around the second seat.

The above Publication No. 63-173736 discloses an arrangement of rear seats in a one-box car in which the rear seats are appropriately divided into sections. Each seat section is biased or displaced to be positioned along the side wall of the vehicle body or the assistant driver's seat. Thus, the seat sections are laterally or forwardly displaced from the central area of the vehicle floor to provide a relatively large loading area in the rear zone thereof.

The above Publication No. 63-179247 discloses another seat mounting construction in which one of slide rails for a first rear seat partially extends to an area below a second rear seat to be used as one of guide rails for the second rear seat, so that the numbers of constituent parts are decreased and installation work may be simplified.

Further, the above Publication No. 2-81738 discloses a seat mounting construction in which a first rear seat is removable away from a vehicle floor and a second rear seat has a seat cushion displaceable upward along its seat back. A fixed slide rail extending forward for moving the second rear seat is provided so as to enhance the efficiency of increase of loading space.

Although the conventional constructions generally comprise guide means for supporting and guiding the first and second rear seats, the guide means includes first and second or front and rear slide rails on which the first and second rear seats are movably mounted respectively. A position of a rear end of the first rails may be determined on the basis of a seatbelt anchor point on a pillar beside the first rear seat, so that the rail end corresponds to an end of a predetermined area range or distance from the anchor point wherein the passenger on the seat can apply the seatbelt. Further, a position of a forward end of the second rail may be determined on the basis of a seatbelt anchor point on a pillar adjacent the second rear seat so that the rail end corresponds to an end of a predetermined area range or distance from the anchor point wherein the passenger on the seat can use the seatbelt.

On the other hand, it is desired to employ various kind of formations or patterns of the seats, for instance, a so-called full-flat position in which a substantially flat seat is formed with the respective seat backs being inclined backward, or a seat position in which the second rear seat is moved backward with the seat back being inclined forward and thereafter the first rear seat is moved backward to the area of the second rear seat.

However, the above conventional mount structures cannot effect such various seat formation because of limitation of the movable area range of the seats depending on the ends of the first and second slide rails.

SUMMARY OF THE INVENTION

It will therefore be appreciated that there has been a significant need for seat mounting construction which is capable of providing the various seat formations in a vehicle.

It is one object of this invention to provide a seat sliding device for a vehicle, which is able to expand or extend the respective movement ranges of the seats spaced in the lengthwise direction of the vehicle, while enabling selection of various seats formations.

It is another object of this invention to provide a seat sliding device for a vehicle, which is able to expand or extend the respective movement ranges of the seats in the lengthwise direction, while ensuring effective application of the seatbelt by the driver or passengers.

To these ends, according to one aspect of the present invention, there is provided a seat sliding device for a vehicle having a first seat and a second seat located rearward of the first seat in a lengthwise direction of the vehicle comprising guide means for guiding the first and second seats in the lengthwise direction, the guide means including: rail means for movably supporting both the first and second seats, the rail means continuously extending in the lengthwise direction over the first seat and the second seat so that the first and second seats are movable substantially throughout the rail means in the lengthwise direction; first sliding means for carrying the first seat movably on the rail means; second sliding means for carrying the second seat movably on the rail means; first latching means for positioning the first seat in place on the rail means, the first latching means being provided on the first sliding means so as to be moved together with the first seat; and second latching means for positioning the second seat in place on the rail means, the second latching means being provided on the second sliding means so as to be moved together with the second seat.

Preferably, a removable stop means for limiting movement of at least one of the first and second seats is further provided in position of said rail means between the first and second seats. The removable stop means may be disposed on the rail means so as to limit backward movement of the first seat and forward movement of the second seat. The position of the removable stop means may be determined on the basis of a position of a seatbelt unit beside the seat, and the removable stop means may be positioned so as to ensure a space sufficient for a passenger on the second seat to place legs between the first and second seats. The removable stop means can include a first stop disposed on the rail means to limit the backward movement of the first seat and a second stop disposed on said rail means to limit the forward movement of the second seat.

More preferably, the rail means may include a pair of parallel rail members which is at least partially embedded in a vehicle floor. The rail means can include a first rail area corresponding to an area range in which a passenger on the first seat can apply a seatbelt for the first seat, a second rail area corresponding to an area range in which a passenger on the second seat can apply a seatbelt for the second seat, a third rail area for movement of the first seat, which rail area extends out of a limit of the first rail area, and a fourth rail area for movement of the second seat, which rail area extends out of a limit of the second rail area. The third rail area is set to partially overlap the fourth rail area. Also, the third rail area may partially overlap said second rail area.

A removable stop for limiting a backward movement of the second seat may be provided on the rail means behind the second seat. The second rail area may be so determined that a passenger on the first seat can apply the seatbelt for the second seat after the second seat has been moved backward and the first seat has been moved backward ith the stop means therebetween being removed. The rail means can have a length sufficient to provide a full-flat seat position. Each of the first and second latching means is preferably a seat adjusting mechanism having a fore and aft adjustment lever, and the rail member may have an engagement portion which is selectively engaged with a latch portion or tongue-like piece of the adjusting mechanism.

From another aspect of the present invention, there is provided a seat sliding device for a vehicle having a plurality of seats including a first seat and a second seat located rearward of the first seat comprising: a pair of continuous rail members for guiding the first and second seats in a lengthwise direction of the vehicle, each of the rails extending across the first and second seats so that both the first and second seats are movable over the rail members in the lengthwise direction; a first slider which carries the first seat movably on the rail members; a second slider which carries the second seat movably on the rail members; a first engagement member for positioning the first seat in place on the rail members, the first engagement member being provided on the first slider so as to be moved together with the first slider; and a second engagement member for positioning the second seat in place on the rail members, the second engagement member being provided on the second slider so as to be moved together with the second slider.

From still another aspect of the present invention, there is provided a vehicle having a plurality of seats including a first seat, a second seat located behind the first seat, a plurality of seatbelt units and a seat sliding device for guiding the first and second seats in a lengthwise direction of the vehicle, wherein the seat sliding device comprises: a pair of continuous rail members for mounting the first and second seats on a vehicle floor slidably in the lengthwise direction, each of the rails extending across the first and second seats so that both the first and second seats are movable over the rail members in the lengthwise direction; a first sliding member which carries the first seat movably on the rail member; a second sliding member which carries the second seat movably on the rail member; a first latch of a first seat adjustment device for positioning the first seat in place on the rail member, the first latch being provided on the first sliding member so as to be moved together with the first sliding member; and a second latch of a second seat adjustment device for positioning the second seat in place on the rail member, the second latch being provided on the second sliding member so as to be moved together with the second sliding member.

These and other objects, features and advantages of the present invention will become apparent from the following detailed description of the preferred embodiments, taken in conjunction with the accompanying drawings.

DESCRIPTION OF THE PREFERRED EMBODIMENTS

Preferred embodiments of the present invention will be described with reference to FIGS. 1 through 14.

Figure 1A:
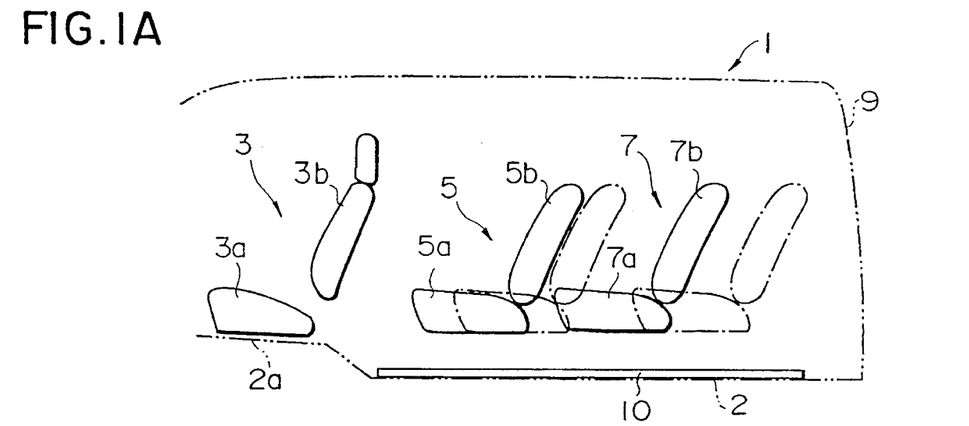
FIGS. 1A, 1B and 1C are schematic side elevational views illustrating three formations or patterns of seats arrangements in the embodiments of a seat sliding device according to the present invention.
Figure 1B:
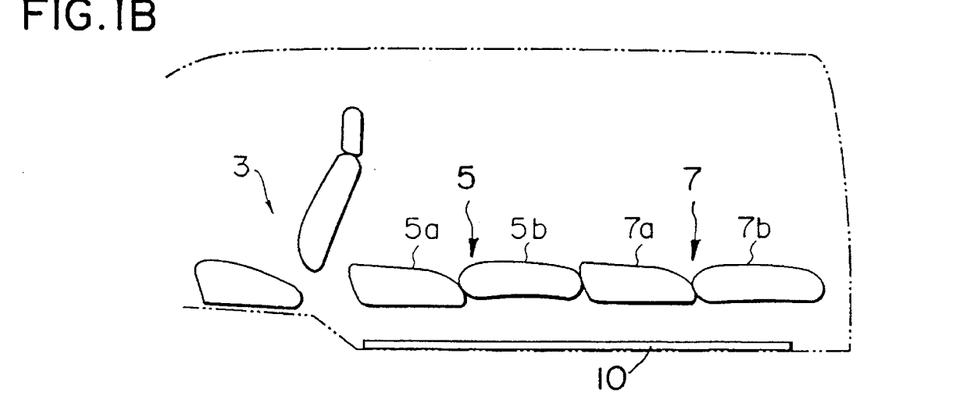
Figure 1C:
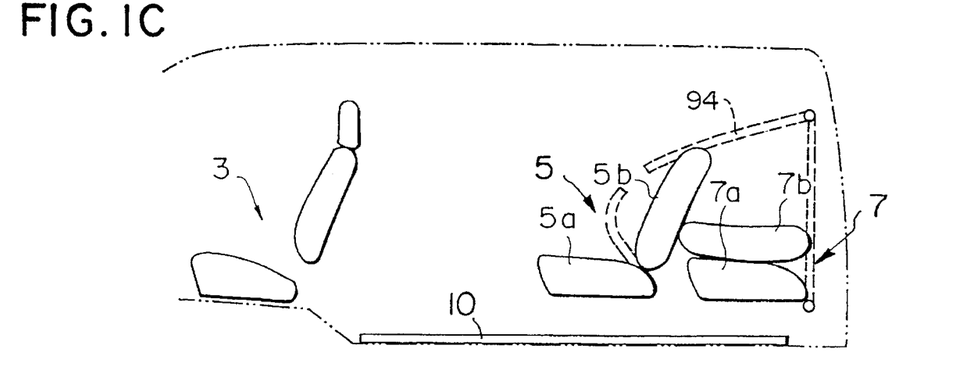

As shown in the drawings for the purpose of illustration, three formations or patterns of seats arrangement are shown in FIG. 1 A) through (C), which formations can be provided by the embodiments of a seat sliding device according to the present invention.

A body of a vehicle 1, which is of a one-box or mono-box type, is generally shown by a phantom line in FIG.1 (A). As shown in FIG. 1 (A), the vehicle 1 comprises a driver's seat 3 and a seat for a passenger or assistant driver (not shown) located in the front zone. A first rear seat or backseat 5 is located backward of the driver's seat 3, and a second rear seat or backseat 7 is located backward of the first rear seat 5. Those seats are shown in a normal position in use. The driver's seat 3 and the seat for a passenger or assistant driver (referred to as assistant driver's seat hereinafter) are mounted on a front area 2a of a vehicle floor 2. The front portion 2a is elevated to form an underside space for containing a vehicle engine. Left and right side front doors (not shown) are positioned beside the driver's seat 3 and the assistant driver's seat, respectively. A side door for passengers (not shown) is positioned beside the first rear seat 5 and a back door 9 is positioned behind the second rear seat 7.

The driver's seat 3 and the first and second rear seats 5, 7 comprise seat cushions 3a, 5a, 7a and seat backs or backrests 3b, 5b, 7b, respectively. The respective backrests 3b, 5b, 7b take standing or upright positions in which passengers can be seated. Further, anchors for first and second seatbelt units (not shown) are located beside the respective backrests 3b, 5b, 7b.

The first and second rear seats 5, 7 are mounted on the floor 2 by means of a seat sliding device 10. The seat sliding device 10 slidably supports the first and second rear seats 5, 7 for forward and backward movement, and if desired, passengers can slide the rear seats 5, 7 forward and backward as shown by phantom lines in FIG. 1 (A). On the other hand, the seat sliding device 10 can limit the forward and backward movement of the rear seats 5, 7 within their predetermined areas in which the passengers can put on and effectively use the respective seatbelts for the rear seats 5, 7, respectively.

In FIG. 1 (B), the first and second rear seats 5, 7 have been transformed to a so-called full-flat seats position. In this full-flat position, the seat cushion 5a of the rear seat 5 is moved forward out of the limit of its predetermined area by the seat sliding device 10, and each backrest 5b, 7b is pivoted backward with respect to each seat cushion 5a, 7a. The seat cushions 5a, 7a and the backrests 5b, 7b cooperate to form a substantially flat plane extending forward and backward, so that a wide and substantially flat seat is provided in the rear zone of the vehicle 1. In this position, the seat cushion 5a of the first rear seat 5 has been slid to its available frontmost position by the seat sliding device 10.

FIG. 1 (C) shows a condition in that the second rear seat 7 has been displaced as far as backward as possible. In this condition, the backrest 7b of the rear seat 7 is pivoted forward with respect to the seat cushion 7a, and the seat cushion 7a is slid to its rearmost position by the seat sliding device 10. On the other hand, the backrest 5b of the first rear seat 5 takes a standing position so that the passenger can be seated. The first rear seat 5 is moved backward out of the rear limit of its predetermined area by the seat sliding device 10, so that a relatively wide open space is created between the driver's seat 3 (or the assistant driver's seat) and the first rear seat 5. This position of the rear seat 5 is an available rearmost position thereof. As FIG. 1C schematically illustrates, a seatbelt 94 (discussed in detail later) for the second rear seat 7 can be applied by a passenger on the first rear seat 5 after the second seat 7 has been moved backward and the first seat 5 has been moved into the rearmost position thereof.

Figure 2:
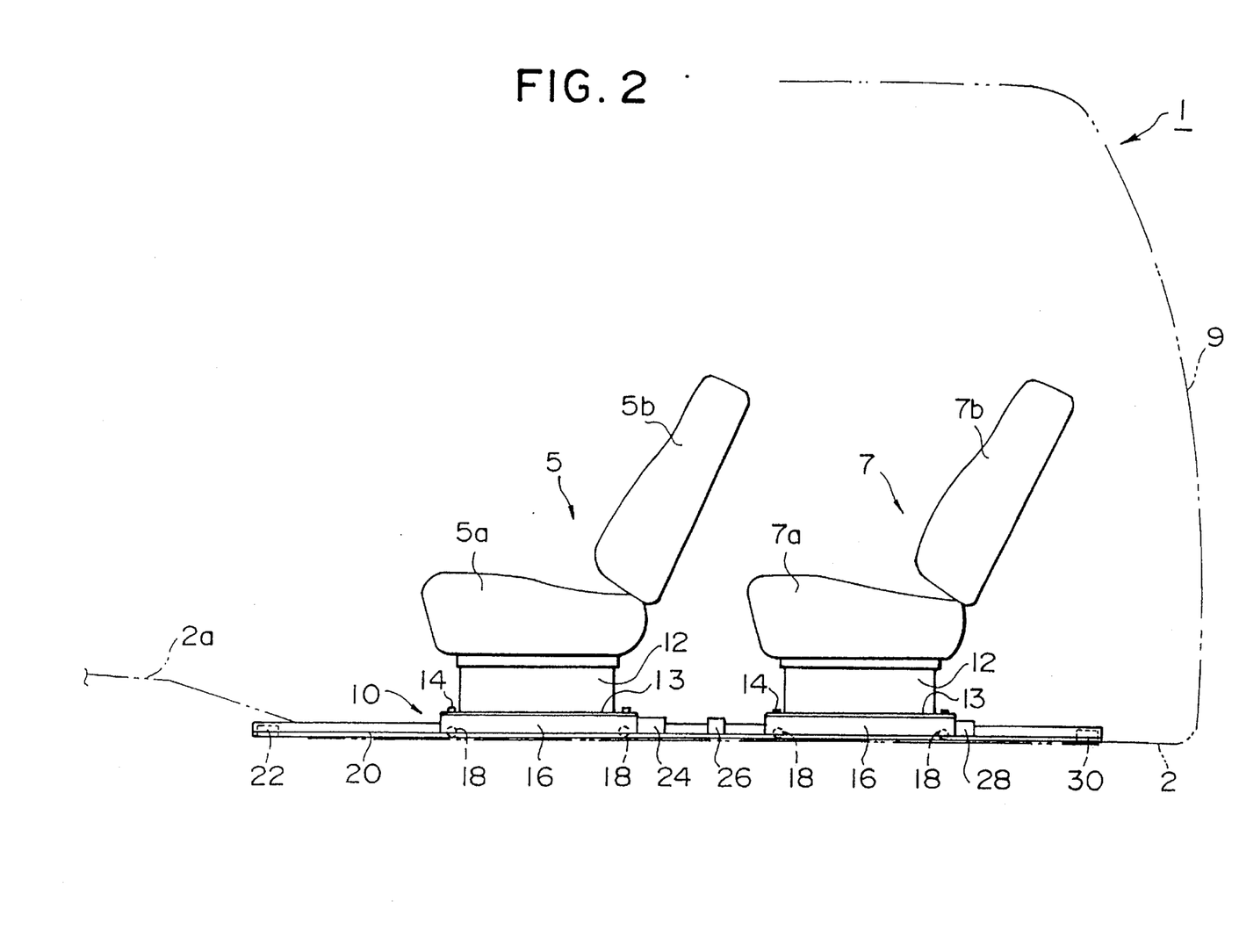
FIG. 2 is a sectional view of a mount structure for a first rear seat and a second rear seat in a first embodiment of the present invention.
Figure 3:
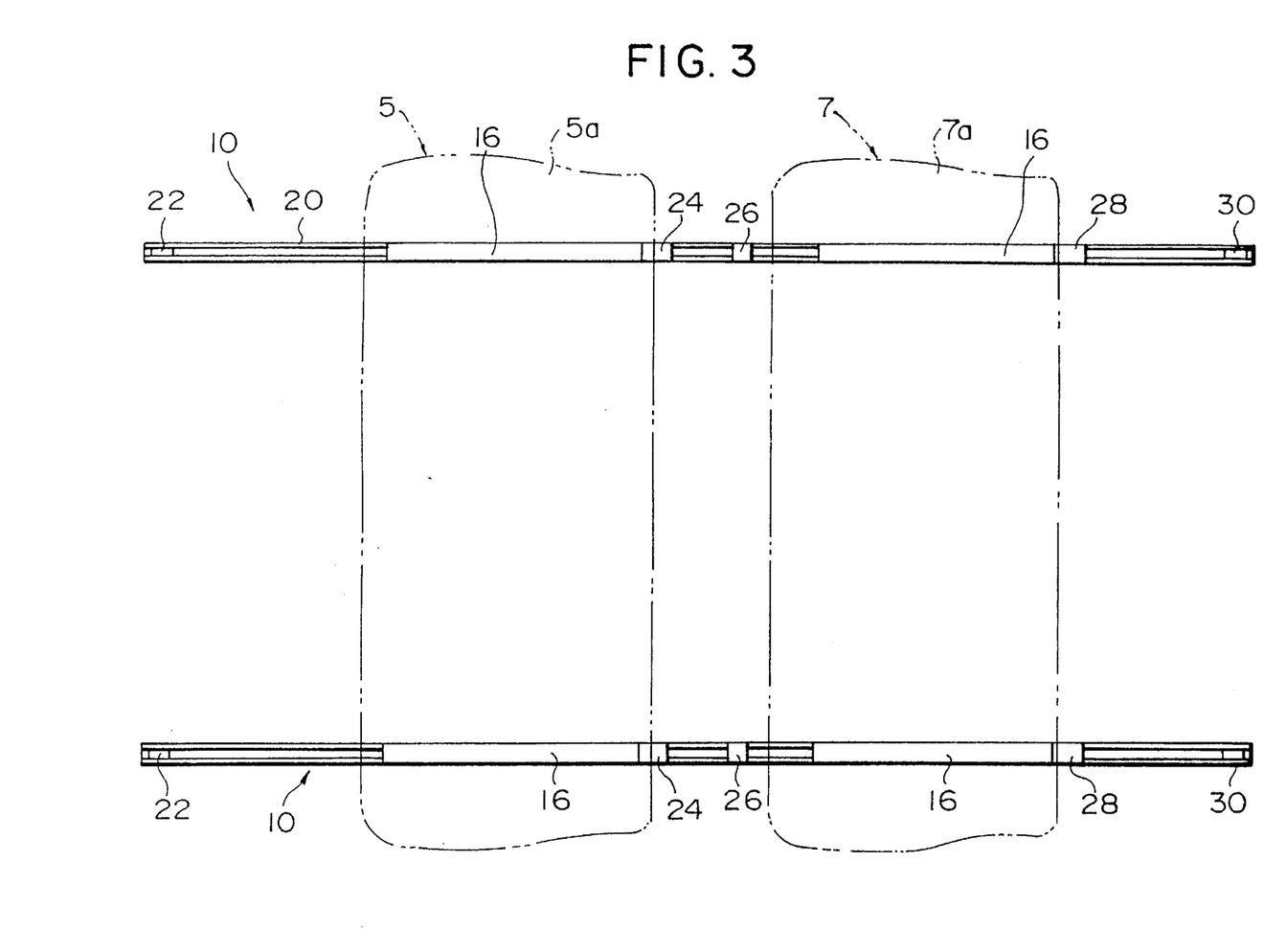
FIG. 3 is a plan view of the mount structure for the first and second rear seats in the first embodiment of the present invention.
Figure 4:
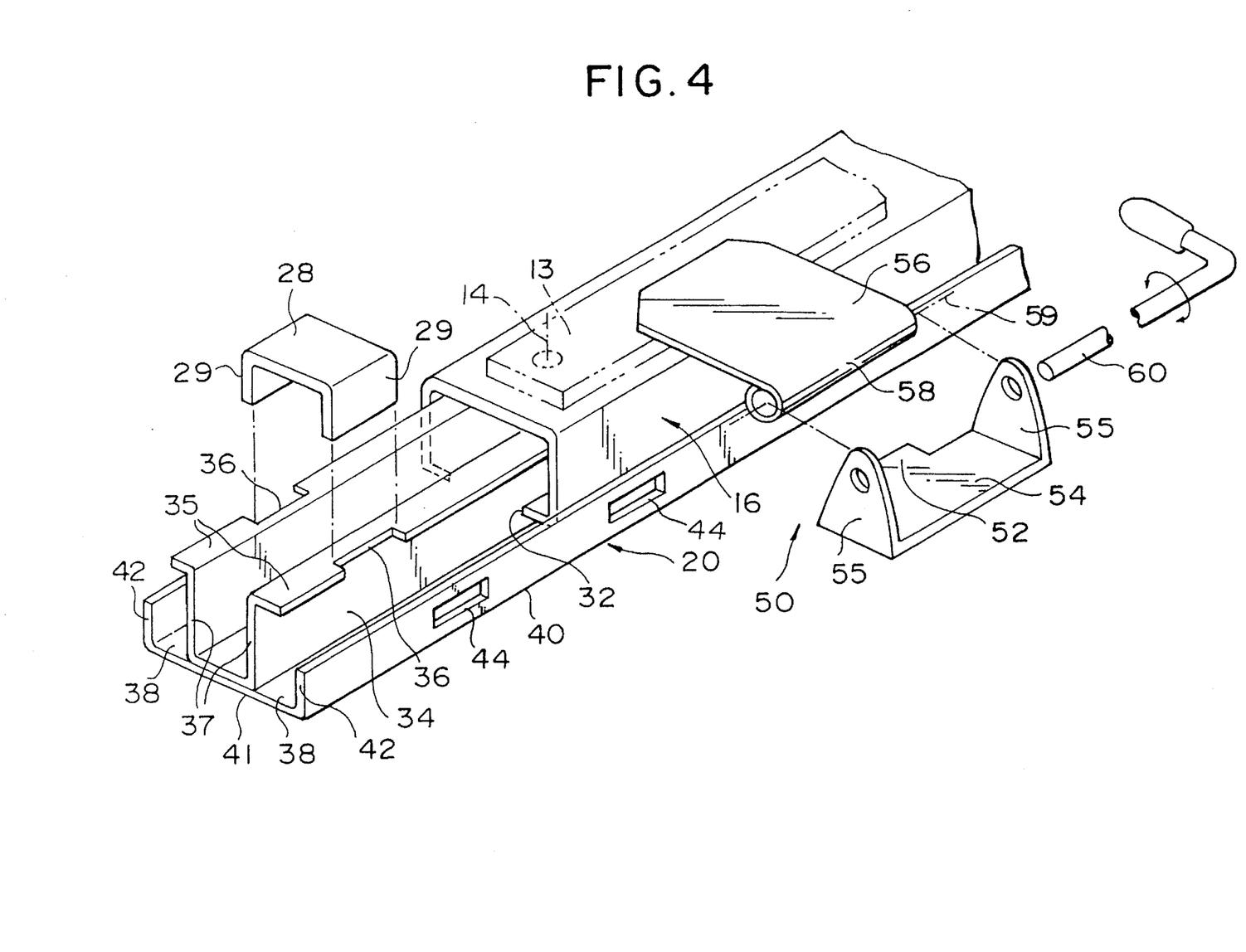
FIG. 4 is a partial fragmentary perspective view showing a construction of the first embodiment of the seat sliding device.
Figure 5:
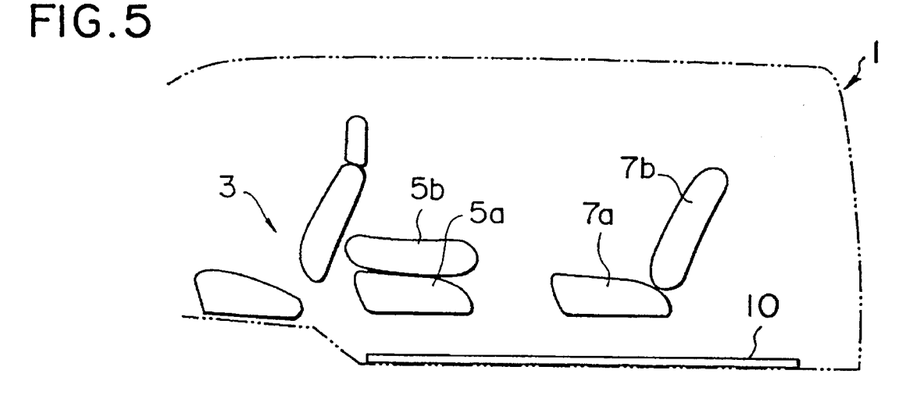
FIGS. 5 through 12 are schematic side elevational views, each of which illustrates one formation of seat arrangement available in the embodiments of the seat sliding device.
Figure 6:
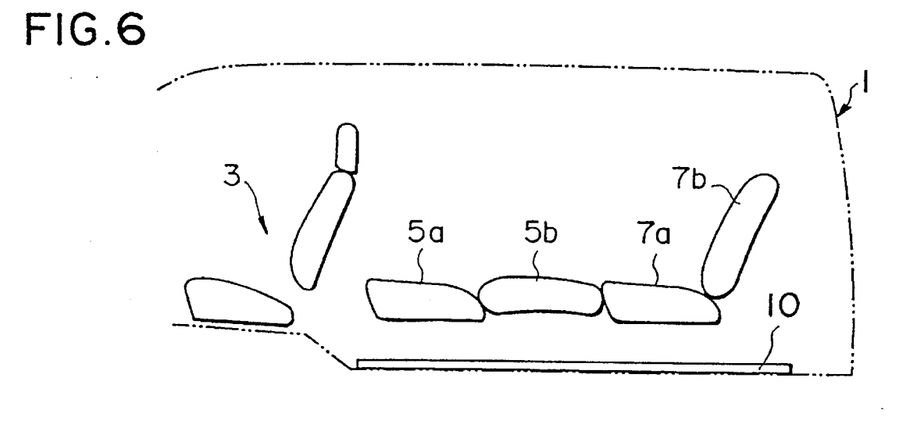
Figure 7:
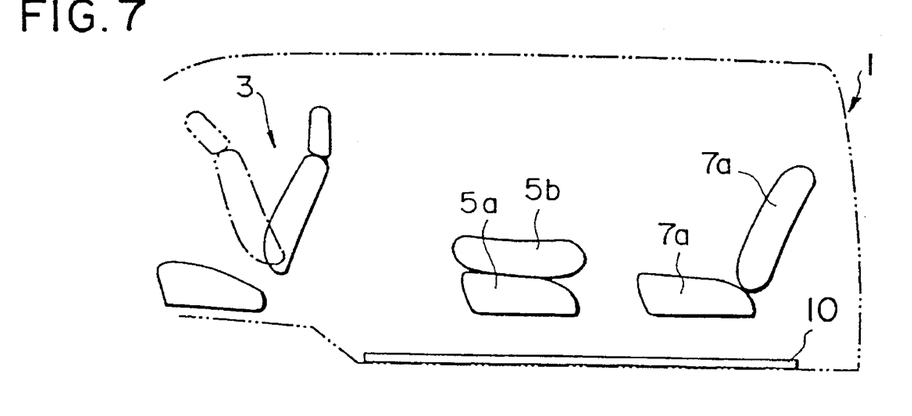
Figure 8:
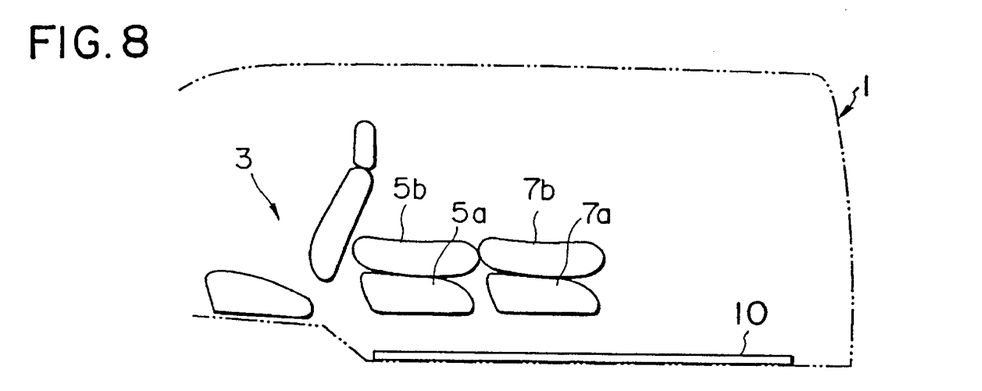
Figure 9:
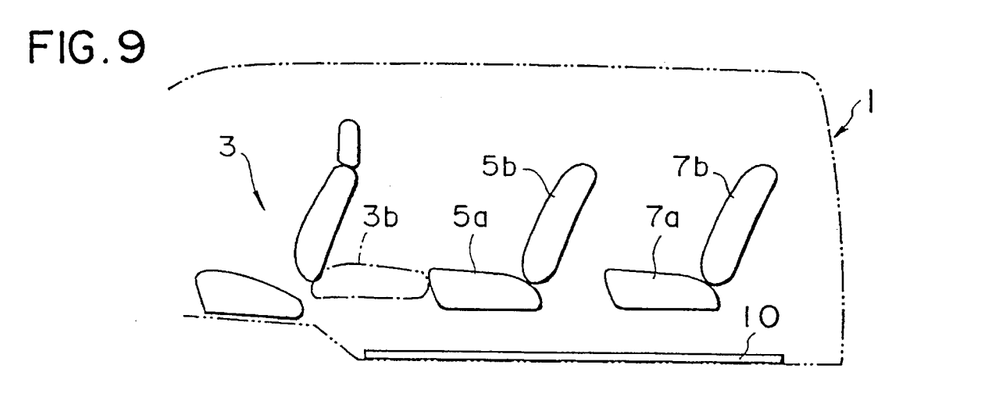
Figure 10:
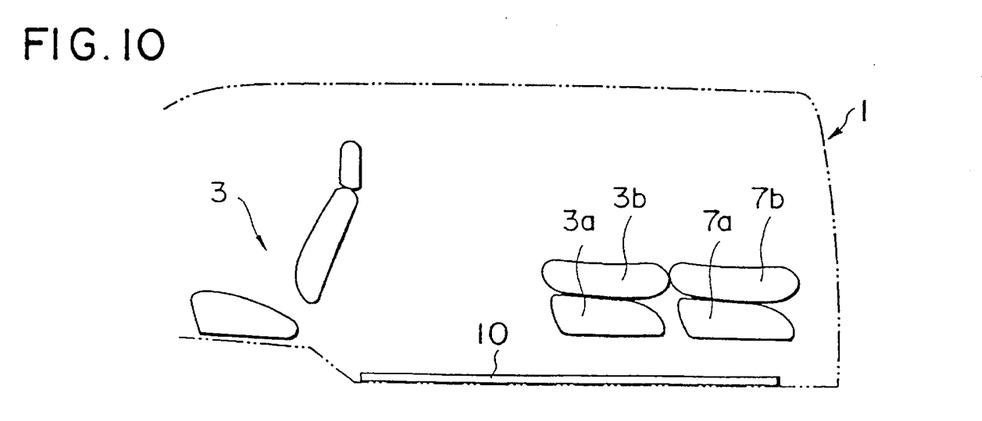
Figure 11:
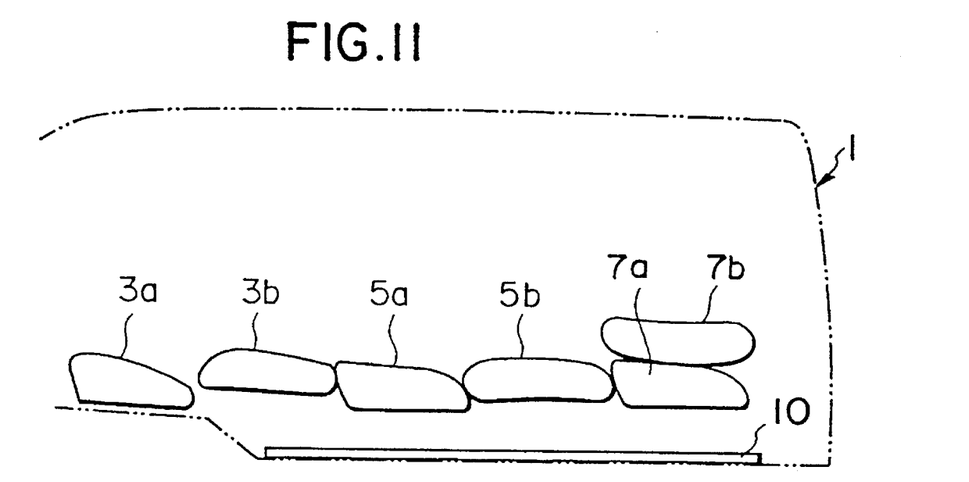
Figure 12:
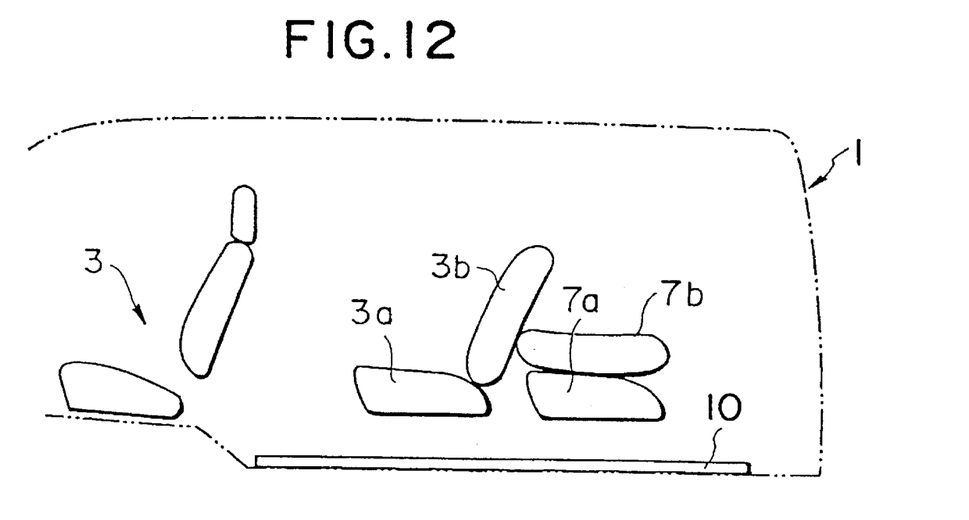

An example of a mount structure for the first and second rear seats 5, 7 is illustrated in FIGS. 2 and 3, and a exemplary construction of the seat sliding device 10 is shown in FIG. 4.

As shown in FIG. 2, seat brackets 12 are fixedly installed beneath the seat cushions 5a, 7a, respectively. The seat brackets 12 extend downward from the respective seat cushions 5a, 7a. A connecting flange 13 is provided at a lower end portion of each bracket 12 so as to longitudinally extend on its lower end. The flange 13 is adapted to be secured to an upper portion of a sliding block or slider 16 by means of fixing bolts 14.

The seat sliding device 10 includes a pair of left and right sliders 16 and a pair of left ad right slide rails 20. The first and second rear seats 5, 7 are provided with the sliders 16, respectively. The slide rails 20, each of which is a length of guide rail directed in the lengthwise direction of the vehicle 1, extend across the first and second seats 5, 7 and slidably support the sliders 16 to guide them forward and backward. Each of the sliders 16 is provided with a pair of front and rear idler rollers 18. The idler rollers 18 rollingly engage in a guide channel of the slide rail 20, so that the slider 16 can longitudinally move along the slide rail 20.

The slide rail 20 is fixed in parallel on the floor 2. As shown in FIG. 3, the slide rails 20 are spaced from each other symmetrically in a direction of the vehicle width. Each slide rail associated with the sliders 16 of the rear seats 5, 7 to define a common guide means for the rear seats 5, 7. Each of the rails 20 extends straightly in the lengthwise direction of the vehicle 1 from a rear end portion of the raised portion 2a to an area immediately before the back door 9.

As shown in FIGS. 2 and 3, each slide rail 20 is provided with stops 22, 24, 26, 28, 30 for blocking the movement of the rear seats 5, 7. The stop 22 for defining the frontmost position of the first rear seat 5 is positioned at a front end of the slide rail 20, and the stop 30 for defining the rearmost position of the second rear seat 7 is positioned at a rear end of the rail 20. The stops 22, 30 are blocking members which bridge the guide channel in the slide rail 20 to prevent further forward or backward movement of the sliders 16.

On the other hand each of the stops 24, 26, 28 disposed in an intermediate region of the slide rail 20 is a removable molded or machined part, which has been so formed as to bridge the guide channel of the rail 20. The stop 24 between the first and second rear seats 5, 7 is positioned so as to set a limit to the backward movement of the first rear seat 5 within a first area in which the passenger on the rear seat 5 can apply the first seatbelt (not shown) beside it. In FIG. 2, the slider 16 of the first rear seat 5 abuts against the stop 24 which blocks further backward movement of the seat 5. Further, the stop 26 is positioned between the first and second rear seats 5, 7 so as to set a limit to the forward movement of the second rear seat 7. The stop 26 is located in position in which it can ensure a space sufficient for the passenger on the second rear seat 7 to place his legs between the seat cushions 5a, 7a. Still further, the stop 28 is positioned behind the second rear seats 7 so as to limit the backward movement of the rear seat 7 within a second area in which the passenger on the second rear seat 5 can apply the second seatbelt (not shown) beside it. In FIG. 2, the slider 16 of the second rear seat 7 abuts against the stop 28 so that further backward movement of the seat 7 is blocked.

The rear portion of the slide rail 20 and the slider 16 of the second rear seat 7 are shown in FIG. 4 in more detail. The slider 16 is constituted by a channel member having a opening 32, which extends in the lengthwise direction and is directed downward. The connecting flange 13 of the seat bracket 12 is integrally mounted on the flat top surface of the channel member 16. An inner guide member 34 of the slide rail 20 extends into the opening 32 and is engaged with the slider 16 for relative movement in the lengthwise direction.

The slide rail 20 comprises the inner guide member 34 and an outer guide member 40 containing the inner member 34. The inner guide member 34 is generally a channel member opening upward, which has left and right side walls 37 and side flanges 35 horizontally outwardly extending from upper ends of the respective side walls 37. The side flanges 35 are formed with notches 36 in position, which removably receive the side walls 29 of the stop 28 to hold it in a predetermined position of the inner guide member 34. The other removable stop 24 or 26 has the substantially same construction as the stop 28 has, and therefore, the stops 24, 26 are removably attached in position of the inner guide member 34 by means of notches similar to the notches 36.

The outer guide member 40 is fixed on the floor 3 (FIG. 2), while the inner guide member 34 is integrally secured on a bottom wall 41 of the outer guide member 40. A guide channel 38 is formed between a side wall 37 of the inner member 34 and a side wall 42 of the outer member 40. The guide channels 38 receive the respective side walls of the slider 16 for guiding it in the lengthwise direction. The depending side walls 29 of the stop 28 are inserted into the guide channels 38 so as to block the movement of the slider 16 at the preselected position.

The outer guide member 40 is formed with a plurality of slots 44 opening in the side walls 42. The slots 44 are spaced apart a predetermined distance and a latch portion 52 of a latch mechanism 50 is selectively received in one of the slots 44. The latch mechanism 50 is provided with a swingable locking member 54 having the latch portion 52, a bracket 56 fixed on the upper surface of the slider 16, and a rotatable latch lever 60 for pivoting the locking member 54 relative to the bracket 56. The lever 60 is a fore and aft adjustment lever. The bracket 56 carried by the slider 16 has a hinge portion 58 at a laterally protruding side. The shaft of the lever 60 is inserted into the hinge portion 58 to extend through holes formed in side walls 55 of the locking member 54. Thus, the locking member 54 is associated with the lever 60 so that rotation of the grip of lever 60 allows the locking member 54 to pivot about the rotation axis 59.

The operation of the above sliding device 10 of this embodiment will be described hereinafter.

A passenger can operate the seat adjustment lever 60 to disengage the latch portion 52 from the slot 44 with rotation of the lever 60. The slider 16 is permitted to move forward and backward along the guide channels 38, but the movement of the slider 16 is confined within the limits of the stops 22, 24, 26, 28 as shown in FIG. 2. That is, the frontward and rearward movement of the first rear seat 5 is limited by the stops 22, 24 respectively, and the frontward and rearward movement of the second rear seat 7 is limited by the stops 26, 28, respectively.

When the rear seats 5, 7 are generally used in their standing positions, the rear seats 5, 7 can be unlocked by the rotation of the seat adjustment levers 60 about the pivot axis 59 and moved forward or backward to their desired positions. In the desired positions, each of the rear seats 5, 7 is locked by the rotation of the adjustment lever 60 to insert the locking portion 52 into the selected slot 44, so that the sliders 16 of the respective rear seats 5, 7 are fixedly secured to the slide rail 20.

When the stops 24, 26, 28 are removed from the slide rail 20, the slider 16 of the second rear seat 7 becomes able to move backward until abutment against the rearmost stop 30, and the slider 16 of the first rear seat 5 becomes able to move backward until the backward movement of the rear seat 5 is blocked by the second rear seat 7. On the other hand, the slider 16 of the firs rear seat 5 is able to move forward until it comes into engagement with the frontmost stop 22, and the slider 16 of the second rear seat 7 is able to move forward until the forward movement thereof is blocked by the first rear seat 5.

In a case where the rear seats 5, 7 should be transformed to a full-flat position as shown in FIG. 1 (B), the adjustment levers 60 are rotated to permit the rear seats 5, 7 to move freely. The first rear seat 5 is moved forward to the frontmost position in which its slider 16 abuts against the frontmost stop 22, and the backrest 5b of the seat 5 is fully reclined backward down to substantially the same level as the seat cushion 5a. Further, the second rear seat 7 is moved forward so that its seat cushion 7a comes into contact with the backrest 5b of the first rear seat 5. Then, the backrest 7b of the rear seat 7 is fully reclined down to substantially the same level as the seat cushion 7a. Thus, a wide and substantially flat seat is provided in the rear zone of the vehicle 1.

If it is desired to create a wide free space between the driver's seat 3 (or the assistant driver's seat) and the first rear seat 5, the confinement of the rear seats 5, 7 is released by rotation of the adjustment levers 60 as the above, and the second rear seat 5 is moved backward to the rearmost position in which its slider 16 abuts against the rearmost stop 30. In the rearmost position, the backrest 7b of the seat 7 is inclined forward so as to fold the seat 7. Then, the first seat 5 is moved backward so that its backrest 5b comes into contact with the backrest 7a of the second rear seat 7. It should be noted that the first rear seat 5 thus moved can be in the second rail area in which the second rear seat 7 has been placed in the mode of use as shown in FIG. 1 (A), and therefore that the passenger on the first rear seat 5 can apply the seatbelt for the second rear seat 7.

As can be seen from the construction of the seat sliding device 10, the first and second rear seats 5, 7 are able to take various positions other than the above described positions. The other formations or patterns of the seats arrangement which can be provided by the seat sliding device 10 are illustrated in FIGS. 5 through 12 as examples.

As apparent from what have been stated above, the seat sliding device 10 comprises a pair of the left and right parallel slide rails 20 on which the first and second rear seats 5, 7 are mounted, and the sliders 16 provided on the rear seats 5, 7 and guided by the slide rails 20 in the lengthwise direction. The slide rails 20 are provided with the stops 22, 30 at the frontmost and rearmost ends, the removable stops 24 behind the first rear seat 5, and the removable stops 26, 28 on the front and rear sides of the second rear seat 7. Further, the slide rail 20 is provided with the spaced slots 44 on the side wall 42, and the latch mechanism 50 having the latch portion 52 selectively insertable into one of the slots 44 is installed to selectively lock the slider 16 on the slide rail 20.

The seat sliding device 10 of the above construction allows the first and second rear seats 5, 7 to move forward and backward on the common slide rails 20. Therefore, compared to the conventional construction having front and rear slide rails for first and second rear seats, the numbers of constituent parts can be greatly reduced and an installation work thereof can be simplified. Further, various kinds of seats formations e.g., a full-flat position, or a position in that the first rear seat 5 moves to the location of the second rear seat 7, are selectively available, whereby applicability or design flexibility of seats arrangement is highly enhanced.

Further, the stops 24, 28 limit the movement of the first and second rear seats 5, 7 within the first and second area in which the passengers can put on the seatbelts, when the seats are to be used with their backrests in the standing positions. Thus, the effective application of seatbelts is ensured. Still further, the stop 26 limits the forward movement of the second rear seat 7 so that a sufficient space for passenger's legs can be ensured between the seat cushions 5a, 7a. In addition, the slide rails 20 can define continuous guide means extending from the driver's seat 3 to the back door 9 with removal of the stops 24, 26, 28, whereby the various kinds of seats arrangements can be provided.

Figure 13:
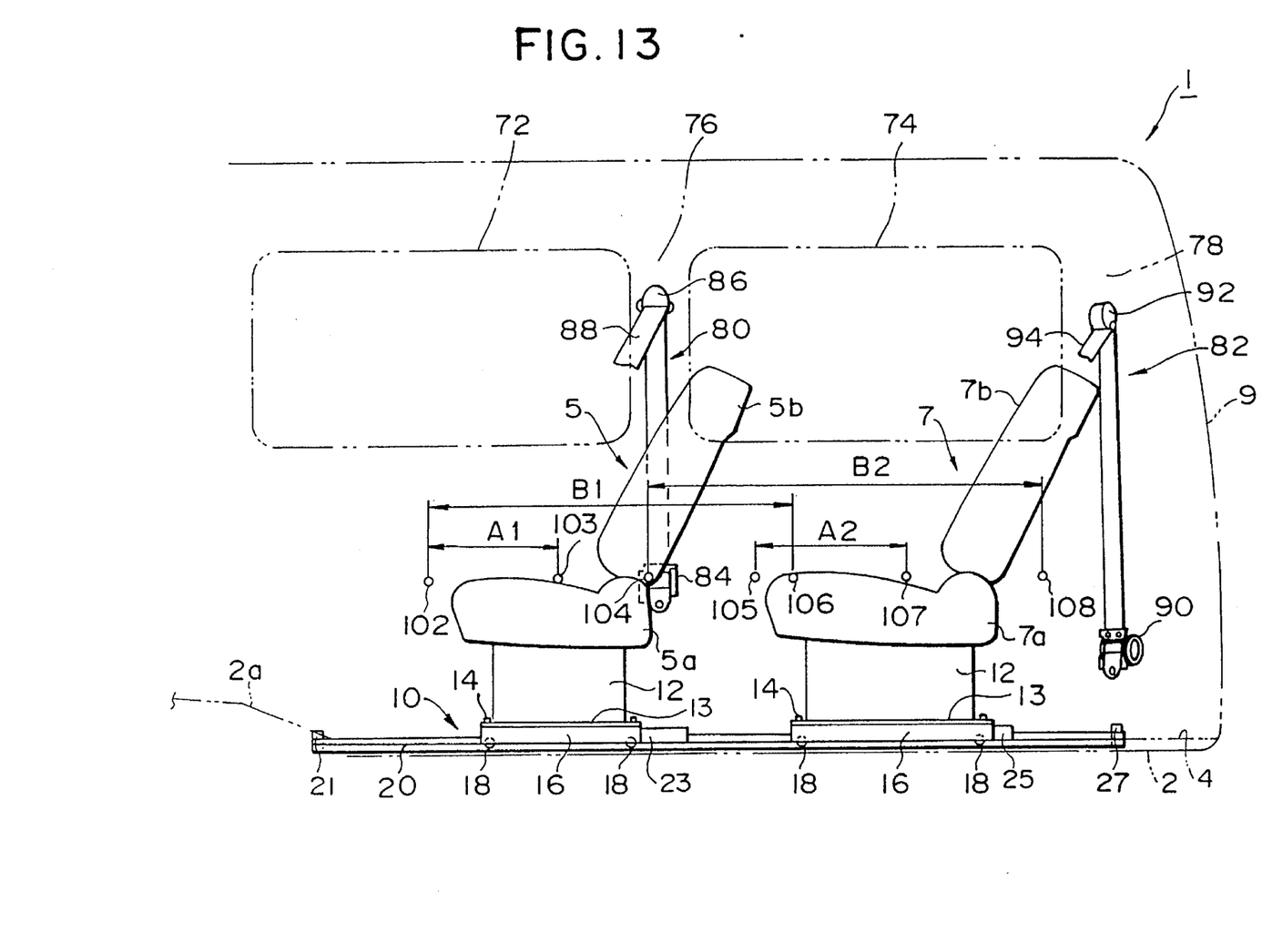
FIG. 13 is a sectional view of a mount structure for a first rear seat and a second rear seat in a second embodiment of the present invention.
Figure 14:
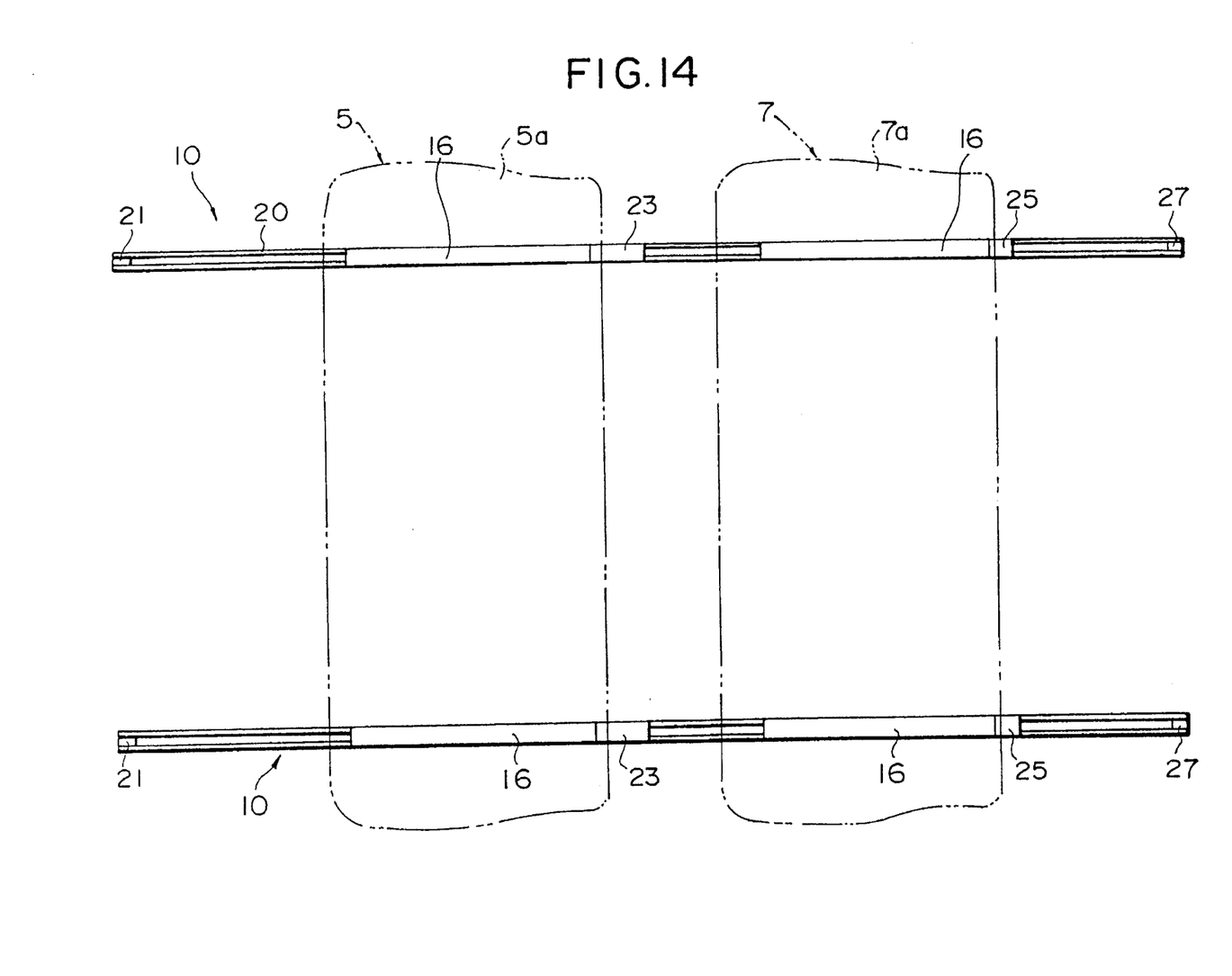
FIG. 14 is a plan view of the mount structure for the first and rear seats in the second embodiment of the present invention.

An alternative embodiment of the invention similar to the embodiment as described above is shown in FIGS. 13 and 14. FIGS. 13 and 14 illustrate first and second rear seats having a seat sliding device of the second embodiment. For ease of understanding, the components of the second embodiment described hereinafter will be similarly numbered to those of the first embodiment. Only the differences in construction will be described in detail.

As shown in FIGS. 13 and 14, each of the slide rails 20 is provided with only one removable stop 23 between the first and second rear seats 5, 7. The stop 23 limits both the backward movement of the first rear seat 5 and the forward movement of the second rear seat 7. That is, the stop 23 has functions of the stops 24, 26 as described above. Each of the slide rails 20 also is provided with another removable stop 25 and two fixed stops 21, 27, the removable stop 25 being located behind the second rear seat 7 and the stops 21, 27 being positioned at the frontward and rearward ends of the rail 20 respectively. The removable stop 23 has a relatively long length so as to prevent a passenger's legs from being caught between the first and second rear seats 5, 7.

In FIG. 13, the vehicle 1 is provided with front side and rear side windows 72, 74. A center pillar 76 is located between the side windows 72, 74 and a rear pillar 78 is located adjacent the rear edge of the window 74. A first seatbelt unit 80 for the passenger on the first rear seat 5 is secured to the center pillar 76, while a second seatbelt unit 82 for the passenger on the second rear seat 7 is secured to the rear pillar 78.

The first seatbelt unit 80 has a retractor 84 disposed at the substantially same level as the seat cushion 5a, an anchor 86 secured at the level above the backrest 5b, and a seatbelt 88 to be used by a passenger. Similarly, the second seatbelt unit 82 includes a retractor 90 at the level of the seat cushion 7a, an anchor 92 above the backrest 7b, and a seatbelt 94.

In FIGS. 13 and 14, reference numerals 102–108 denote hip points of the passengers on the rear seats 5, 7, respectively. In this embodiment, an area A1 indicated by the hip points 102, 103 is a first area in which the passenger on the first rear seat 5 can effectively use the seatbelt 88, whereas an area A2 indicated by the hip point 105, 107 is a second area in which the passenger on the second rear seat 7 can effectively use the seatbelt 94. In the first area A1, the first seat 5 can move forward and backward until the movement is blocked by the rear end of the fixed stop 21 or the front end of the removable stop 23. In the second area A2, the second seat 7 can move forward and backward until the movement is blocked by the rear end of the removable stop 23 or the front end of the removable stop 25.

Further, an area B1 indicated by the hip points 102, 106 is a third area in which the first rear seat 5 would be able to move with the stops 23, 25 being removed from the rail 20, while an area B2 indicated by the hip points 104, 108 is a fourth area in which the second rear seat 7 would be able to move without the stops 23, 25. The rear limit 106 of the area B1 and the front limit 104 of the area B2 depend on interference between the first and second rear seats 5, 7. The hip point 102 defines a front end of the first area A1 and that of the third area B1. The front end of the first area A1 may be positioned frontward of the third area B1. The third area B1 partially overlaps the second and fourth areas A2, B2.

The floor 2 is formed with floor beads (not shown) extending in the lengthwise direction. The rail 20 is installed in a lengthwise groove or recess (not shown) between the beads by means of brackets (not shown), so that the upper end of the outer guide member 40 (FIG. 4) is adapted to be substantially in the same level as the floor level or floor mat level 4. The latch mechanism 50 associated with this rail 20 preferably includes a vertically movable tongue-like piece which is adapted to engage and disengage with the rail 20 when moving upward and downward.

The operation in the second embodiment will be described.

When the stops 23, 25 are attached to the slide rail 20, the forward and backward movement of the first rear seat 5 is blocked by the stops 21, 23 and the forward and backward movement of the second rear seat 7 is blocked by the stops 23, 25. The first and second rear seats 5, 7 also may move forward and backward within the areas A1, A2 with release of the seat adjustment lever 60 as shown in FIG. 4. The frontward and rearward limits 102, 107 of the areas A1, A2 are determined, based on the positions of the seatbelt units 80, 82. The frontmost and rearmost limits 102,108 of the areas B1, B2 may depend on the positions of the frontmost and rearmost slots 44.

If the stops 23, 25 are removed from the respective slide rails 20, the first and second rear seats 5, 7 are permitted to move within the areas B1, B2 and the passenger thereon can set the seats 5, 7 in their desired positions by engagement of the latch mechanisms 50 with the selected slots 44, respectively.

According to the second embodiment, the stop 23 acts as stop means for the first and second rear seats 5, 7, and therefore, the number of stop members and installation work therefor are further reduced or simplified, compared to the first embodiment. The second embodiment also enables the seats to take various positions, e.g., the full-flat position or the position in that the first rear seat 5 occupies the place of the second rear seat 7. Thus, this embodiment also makes it possible to enhance the design flexibility of seats arrangement, while ensuring effective application of the seatbelts and sufficient space for passenger's legs.

The present invention has thus been shown and described with reference to the specific embodiments. However, it should be noted that the present invention is in no way limited to the details of the described arrangement but changes and modifications may be made without departing from the scope of the appended claims.

For example, the fixed stops 21, 27 or the removable stop 25 behind the second rear seat 7 may be omitted, or alternative structure of the latching mechanism 50, such as a mechanism with a remote controlled electric drive may be adapted. Further, one or more slide rails may be provided in addition to the pair of slide rails 20. Still further, the present invention may be applied to the other type of vehicle, e.g., a vehicle having a driver's seat and only one rear seat or a vehicle including three or more rows of rear seats.

What is claimed is:

1. A seat sliding device for a vehicle having a first seat, a second seat located rearward of the first seat in a lengthwise direction of the vehicle, guide means for guiding the first and second seats in the lengthwise direction, and a first seatbelt unit for the first seat and a second seatbelt unit for the second seat provided in the vehicle, the guide means comprising:

rail means for movably supporting both the first and second seats, the rail means continuously extending in the lengthwise direction past the first seat and the second seat so that the first and second seats are movable substantially throughout a length of the rail means in the lengthwise direction;

first sliding means for carrying the first seat movably on the rail means;

second sliding means for carrying the second seat movably on the rail means;

first latching means for positioning the first seat in place on the rail means, the first latching means being provided on the first sliding means so as to be moved together with the first seat;

second latching means for positioning the second seat in place on the rail means, the second latching means being provided on the second sliding means so as to be moved together with the second seat;

a first stop, provided within an effective area of said rail means along which the first sliding means is movable on the rail means, for limiting rearward movement of the first seat; and a second stop, provided within the effective area of the rail means along which the second sliding means is movable on the rail means, for limiting forward movement of the second seat;

wherein (1) the first and second stops are positionable so that a desired distance between the first seat and the second seat remains when rearward movement of the first seat and forward movement of the second seat are limited by the first and second stops, respectively, (2) seatbelts of the first and second seatbelt units are useable when rearward movement of the first seat is limited by said first stop and forward movement of the second seat is limited by the second stop, and (3) the first and second stops are releasable so that the first and second seats may be positioned by said first and second latching means within the effective area of the rail meads but beyond positions for the first and second stops.

2. A seat sliding device according to claim 1, wherein said first stop is disposed between the first and second seats and said second stop is also disposed between the first and second seats.

3. A seat sliding device according to claim 1, and further comprising a third stop, provided within the effective area of the rail means along which the second sliding means is movable on the rail means, for limiting rearward movement of the second seat, the third stop being releasable so that the second seat may be positioned within the effective area of the rail means but beyond a position for the third stop.

4. A seat sliding device according to claim 3, wherein said rail means includes a first rail area in which a passenger on the first seat can apply the seatbelt of the first seatbelt unit, a second rail area in which a passenger on the second seat can apply the seatbelt of the second seatbelt unit, a third rail area which extends past a limit of the first rail area and through which the first seat can move when said first stop is released, and a fourth rail area which extends past a limit of the second rail area, which partially overlaps the third rail area and through which the second seat can move when said second and third stops are released.

5. A seat sliding device according to claim 4, wherein said third rail area partially overlaps said second rail area.

6. A seat sliding device according to claim 4, wherein said first sear is movable into the second rail area.

7. A seat sliding device according to claim 6, wherein said second rail area is determined so that a passenger on the first seat can apply the seatbelt of the second seatbelt unit after the second seat bas been moved backward and the first seat has been moved backward with the first, second and third stops being released.

8. A seat sliding device according to claim 1, wherein said first stop and said second stop are positioned so as to ensure a space sufficient for a passenger on the second seat to place legs between the first and second seats.

9. A seat sliding device according to claim 1, and further comprising a first fixed stop setting a forward limit to movement of the first seat disposed at a front end portion of said rail means and a second fixed stop setting a backward limit to movement of the second seat disposed at a rear end portion of said rail means.

10. A seat sliding device according to claim 1, wherein said length of said rail means is sufficient to permit backrests of the first and second seats to be inclined backward in order to provide full-flat seat positions.

11. A seat sliding device according to claim 1, wherein said first and second latching means are adjusting mechanisms for locking the first and second seats in positions and releasing the seats from locked positions.

12. A seat sliding device according to claim 1, wherein said first seat is a rear seat located rearward of a driver's seat and said second seat is another rear seat located rearward of the first seat.

13. A seat sliding device according to claim 1, wherein said rail means includes a pair of parallel rail members, and said rail means has an engagement portion which is selectively engaged with a latch of the first latching means and a latch of the second latching means.

14. A seat sliding device according to claim 1, wherein said first latching means includes an operable latch which is adjusted by a passenger to selectively position the first seat in its desired position, and said second latching means includes an operable latch which is adjusted by a passenger to selectively position the second seat in its desired position.

15. A seat sliding device for a vehicle having a plurality of seats, including a first seat and a second seat located rearward of the first seat, and a first seatbelt unit for the first seat and a second seatbelt unit for the second seat provided in the vehicle, comprising:

a pair of continuous rail members for guiding the first and second seats in a lengthwise direction of the vehicle, each of said rail members extending past the first and second seats so that both the first and second seats are movable along said rail members in the lengthwise direction;

a first slider which carries the first seat movably on the rail members;

a second slider which carries the second seat movably on the rail members;

a first engagement member for positioning the first seat in place on the rail members, the first engagement member being provided on the first slider so as to be moved together with the first slider;

a second engagement member for positioning the second seat in place on the rail members, the second engagement member being provided on the second slider so as to be moved together with the second slider;

a first stop, provided within an effective area of said rail members along which the first slider is movable on the rail members, for limiting rearward movement of the first seat; and a second stop, provided within the effective area of the rail members along which the second slider is movable on the rail members, for limiting forward movement of the second seat;

wherein (1) the first and second stops are positionable so that a desired distance between the first seat and the second seat remains when rearward movement of the first seat and forward movement of the second seat are limited by the first and second stops, respectively, (2) seatbelts of the first and second seatbelt units are useable when rearward movement of the first seat is limited by said first stop and forward movement of the second seat is limited by the second stop, and (3) the first and second stops are releasable so that the first and second seats may be positioned by said first and second engagement members within the effective area of the rail members but beyond positions for the first and second stops.

16. A vehicle having a plurality of seats including a first seat, a second seat located behind the first seat, a first seatbelt unit for the first seat and a second seatbelt unit for the second seat provided in the vehicle, and a seat sliding device for guiding the first and second seats in a lengthwise direction of the vehicle, the seat sliding device comprising:

a pair of continuous rail members for mounting the first and second seats on a vehicle floor slidably in the lengthwise direction, each of said rail members extending past the first and second seats so that both the first and second seats are movable along said rail members in the lengthwise direction;

a first sliding member which carries the first seat movably on at least one of the rail members;

a second sliding member which carries the second seat movably on at least one of the rail members;

a first stop, provided within an effective area of said rail members along which the first sliding member is movable on the rail members, for limiting rearward movement of the first seat; and a second stop, provided within the effective area of the rail members along which the second sliding member is movable on the rail members, for limiting forward movement of the second set;

wherein (1) the first and second stops are positionable so that a desired distance between the first seat and the second seat remains when rearward movement of the first seat and forward movement of the second seat are limited by the first and second stops, respectively, (2) seatbelts of the first and second seatbelt units are useable when rearward movement of the first seat is limited by said first stop and forward movement of the second seat is limited by the second stop, and (3) the first and second stops are releasable so that the first and second seats may be positioned within the effective area of the rail members but beyond positions for the first and second stops;

said first seat being a rear seat located rearward of a driver's seat, and slidable areas of the first and second seats being set in such a manner that a passenger on the first seat can apply the seatbelt of the second seatbelt unit after the second seat has been moved backward to its rearmost position and the first seat has been moved rearward with said first and second stops removed.

17. A vehicle according to claim 16, wherein the vehicle is a car of one-box type in which said first seat is a first rear seat behind a driver's seat and said second seat is a second rear seat behind the first rear seat.

18. A seat sliding device according to claim 16, wherein said first stop is disposed between the first and second seats and said second stop is also disposed between the first and second seats.

19. A seat sliding device according to claim 16, and further comprising a third stop, provided within the effective area of the rail members along which the second sliding member is movable on the rail members, for limiting rearward movement of the second seat, the third stop being releasable so that the second seat may be positioned within the effective area of the rail members but beyond a position for the third stop.

20. A seat sliding device according to claim 19, wherein each of said rail members includes a first rail area in which a passenger on the first seat can apply the seatbelt of the first seatbelt unit, a second rail area in which a passenger on the second seat can apply the seatbelt of the second seatbelt unit, a third rail area which extends past a limit of the first rail area and through which the first seat can move when said first stop is released, and a fourth rail area which extends past a limit of the second rail area, which partially overlaps the third rail area and through which the second seat can move when said second and third stops are released.

21. A seat sliding device according to claim 20, wherein said third rail area partially overlaps said second rail area.

* * * * *